United States Patent
Seki et al.

(10) Patent No.: US 8,660,388 B2
(45) Date of Patent: Feb. 25, 2014

(54) OPTICAL MODULATION APPARATUS, METHOD FOR CONTROLLING OPTICAL MODULATOR, AND CONTROL DEVICE FOR OPTICAL MODULATOR

(75) Inventors: Morihiro Seki, Osaka (JP); Katsumi Uesaka, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 153 days.

(21) Appl. No.: 13/306,329

(22) Filed: Nov. 29, 2011

(65) Prior Publication Data

US 2012/0134619 A1    May 31, 2012

(30) Foreign Application Priority Data

Nov. 30, 2010 (JP) .................................. 2010-267622

(51) Int. Cl.
*G02F 1/35* (2006.01)
(52) U.S. Cl.
USPC ............................................................ 385/3
(58) Field of Classification Search
USPC ............................................................ 385/3
See application file for complete search history.

(56) References Cited

U.S. PATENT DOCUMENTS

| | | | | |
|---|---|---|---|---|
| 5,119,447 A * | 6/1992 | Trisno | ................................ | 385/3 |
| 6,400,490 B1 * | 6/2002 | Hosoi | ............................ | 359/254 |
| 6,618,536 B1 * | 9/2003 | Heideman et al. | ............. | 385/132 |
| 6,684,013 B2 * | 1/2004 | Seki et al. | ......................... | 385/50 |
| 7,447,389 B2 * | 11/2008 | Sugiyama | .......................... | 385/9 |
| 2002/0003648 A1 * | 1/2002 | Kobayashi et al. | ............ | 359/180 |
| 2003/0021509 A1 * | 1/2003 | Yap et al. | ............................ | 385/3 |
| 2004/0170351 A1 * | 9/2004 | Fishman et al. | .................... | 385/3 |
| 2004/0184723 A1 * | 9/2004 | Chandrasekhar et al. | ....... | 385/27 |
| 2007/0217737 A1 * | 9/2007 | Gill et al. | ........................... | 385/27 |
| 2010/0027935 A1 * | 2/2010 | Shiraishi | ............................ | 385/2 |
| 2011/0229070 A1 * | 9/2011 | Doi et al. | ........................... | 385/3 |
| 2013/0136388 A1 * | 5/2013 | Uesaka et al. | ..................... | 385/3 |

FOREIGN PATENT DOCUMENTS

JP    7-049473 A    2/1995

OTHER PUBLICATIONS

"Product Handling and User Recommendations for the Bookham Tunable Transmitter Assembly (TTA)", Boookham, Sep. 2007.

* cited by examiner

*Primary Examiner* — Charlie Peng
(74) *Attorney, Agent, or Firm* — Westerman, Hattori, Daniels & Adrian, LLP (57) ABSTRACT

An optical modulation apparatus including: a Mach-Zehnder optical modulator having two optical waveguides, two output optical waveguides and a join-and-branch portion; a phase adjustment circuit configured to output a phase control signal to phase adjustment electrodes provided respectively on the two optical waveguides; a drive circuit configured to output a modulation signal to modulation electrodes provided respectively on the two optical waveguides as a differential signal, the modulation signal modulating lights propagated in the two optical waveguides; and a signal polarity reversal circuit configured to reverse a polarity of the differential signal to be output from the drive circuit.

11 Claims, 9 Drawing Sheets

COMPARATIVE EXAMPLE 1

OPTICAL MODULATION APPARATUS, METHOD FOR CONTROLLING OPTICAL MODULATOR, AND CONTROL DEVICE FOR OPTICAL MODULATOR

CROSS-REFERENCE TO RELATED APPLICATION

This application is based upon and claims the benefit of priority of the prior Japanese Patent Application No. 2010-267622, filed on Nov. 30, 2010, the entire contents of which are incorporated herein by reference.

BACKGROUND (i) Technical Field

A certain aspect of the embodiments discussed herein is related to an optical modulation apparatus, a method for controlling an optical modulator, and a control device for an optical modulator.

(ii) Related Art

In an optical communication system that superimposes a signal on a light and transmits the light with an optical fiber, an optical modulator that modulates the power of an laser light emitted from a light source, and generates an optical signal is used. For example, a Mach-Zehnder optical modulator is known as the optical modulator (See Japanese Patent Application Publication No. 07-049473).

The Mach-Zehnder optical modulator has a waveguide structure including a branch portion that branches an input light, two optical waveguides that propagate the branched lights, and a multiplex portion that multiplexes the lights propagated through the optical waveguides again. The Mach-Zehnder optical modulator is the optical modulator that turns on or off the light according to an interference condition at the time of multiplexing the lights.

SUMMARY

When the waveguides of the Mach-Zehnder optical modulator are manufactured, manufacture variation may occur in the width and the length of the waveguides in no small part, and a phase difference of the lights propagated in the two optical waveguides may deviate from a preset value. To adjust such shifting of the phase difference, a voltage is applied to electrodes provided on the two optical waveguides, respectively, so that the phase adjustment is performed.

When the shifting of the phase difference is large in such a phase adjustment, an amount of the phase adjustment increases. To increase the amount of the phase adjustment can cope by lengthening the electrodes or increasing the voltage applied to the electrodes. However, in this case, there is a problem that a propagation loss of the light increases.

It is an object of the present invention to provide an optical modulation apparatus, a method for controlling an optical modulator, and a control device for an optical modulator that can restrain the propagation loss of the light from increasing, and perform the phase adjustment.

According to an aspect of the present invention, there is provided an optical modulation apparatus including: a Mach-Zehnder optical modulator having two optical waveguides, two output optical waveguides and a join-and-branch portion; a phase adjustment circuit configured to output a phase control signal to phase adjustment electrodes provided respectively on the two optical waveguides; a drive circuit configured to output a modulation signal to modulation electrodes provided respectively on the two optical waveguides as a differential signal, the modulation signal modulating lights propagated in the two optical waveguides; and a signal polarity reversal circuit configured to reverse a polarity of the differential signal to be output from the drive circuit.

DETAILED DESCRIPTION

Figure 1:
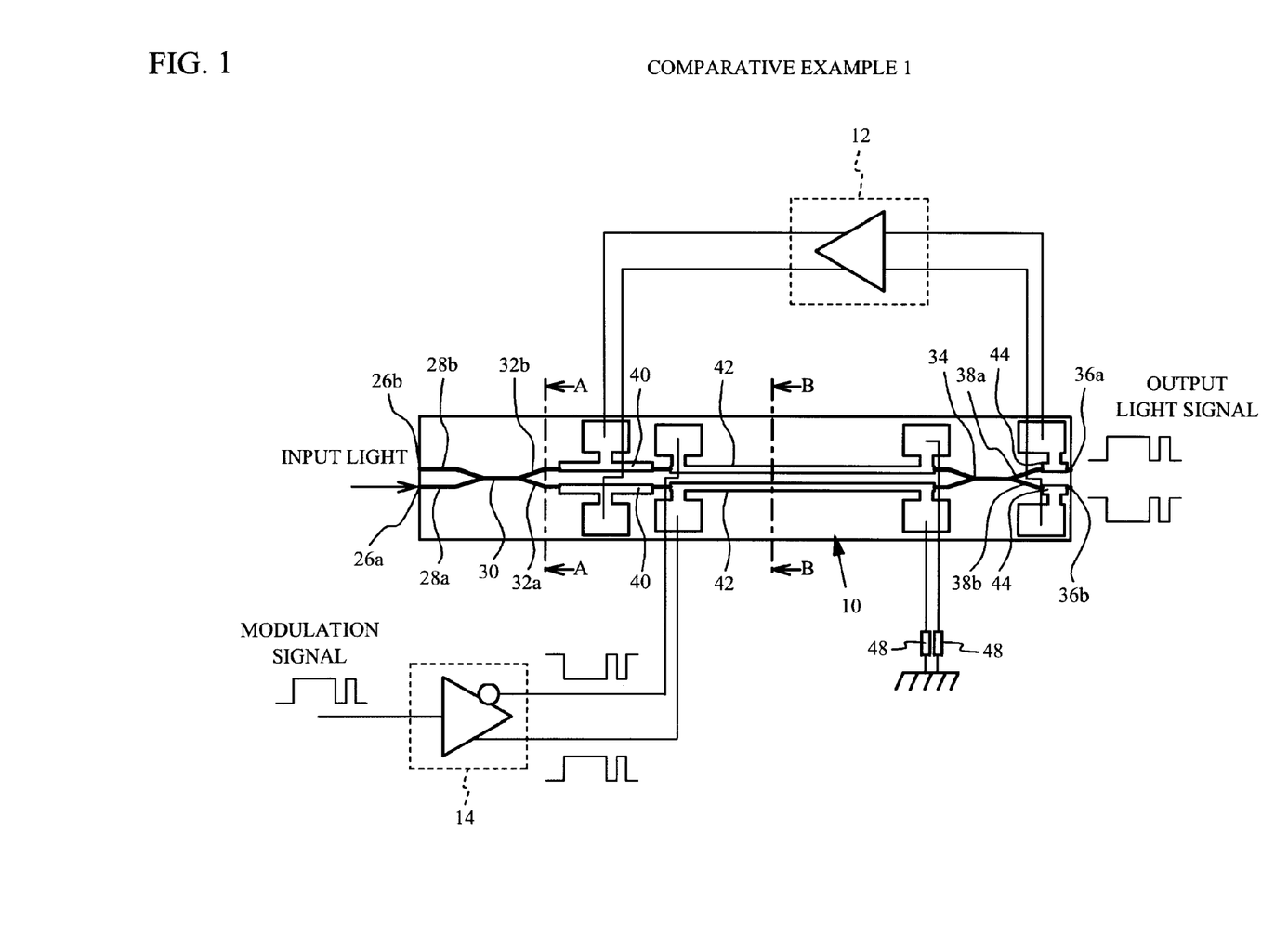
FIG. 1 is a schematic top view of an optical modulation apparatus according to a comparative example 1.

First, a description will be given of an optical modulation apparatus according to a comparative example 1. FIG. 1 is a schematic top view of the optical modulation apparatus according to the comparative example 1. As illustrated in FIG. 1, the optical modulation apparatus according to the comparative example 1 mainly includes a Mach-Zehnder optical modulator 10, a phase adjustment circuit 12, and a drive circuit 14.

Figure 2A:
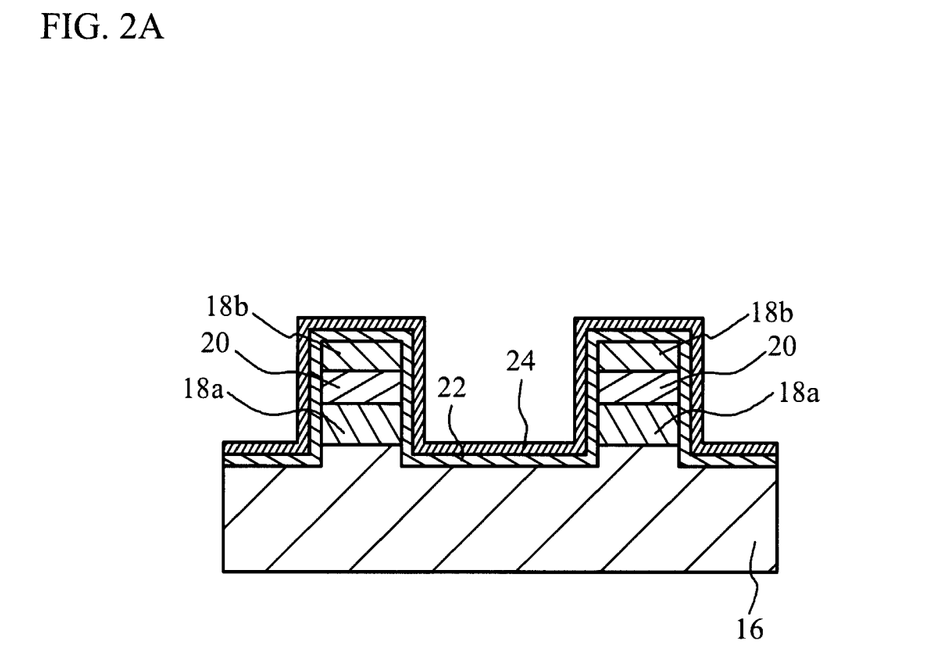
FIG. 2A is a schematic cross-sectional diagram taken along a line A-A depicted in FIG. 1.
Figure 2B:
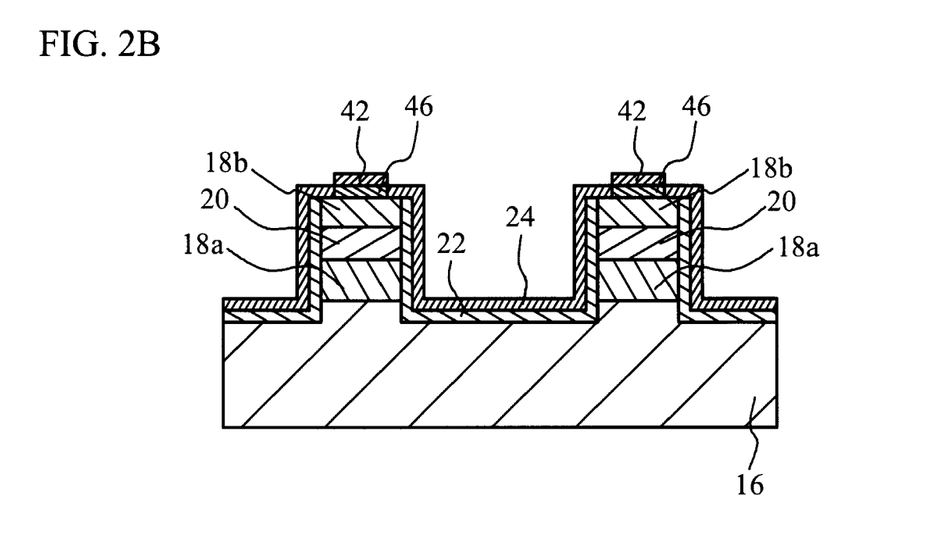
FIG. 2B is a schematic cross-sectional diagram taken along a line B-B depicted in FIG. 1.

The Mach-Zehnder optical modulator 10 is configured by combining routes of mesa-shaped optical waveguides on a semiconductor substrate. FIG. 2A is a schematic cross-sectional diagram taken along a line A-A depicted in FIG. 1, and FIG. 2B is a schematic cross-sectional diagram taken along a line B-B depicted in FIG. 1.

As illustrated in FIG. 2A, the optical waveguides are formed on a semiconductor substrate 16. Each waveguide has a structure in which a lower cladding layer 18a, a core 20, and a upper cladding layer 18b are laminated in a mesa shape on the semiconductor substrate 16 in this order. A passivation layer 22 and an insulating layer 24 are laminated on an upper surface of the semiconductor substrate 16 and an upper surface and side surfaces of each waveguide in this order.

The semiconductor substrate 16 is made of a semiconductor such as InP, for example. The lower cladding layer 18a and the upper cladding layer 18b are made of a semiconductor such as InP, for example. The core 20 is made of a semiconductor, such as InGaAsP for example, having band-gap energy smaller than the lower cladding layer 18a and the upper cladding layer 18b. Thereby, the light propagated in the core 20 is confined with the lower cladding layer 18a and the upper cladding layer 18b. The passivation layer 22 is made of a semiconductor such as InP, for example. The insulating layer 24 is made of a semiconductor such as SiN, for example.

As illustrated in FIG. 1, a first input optical waveguide 28a connected to a first input end 26a, and a second input light 28b waveguide connected to a second input end 26b are provided in the Mach-Zehnder optical modulator 10. The first input optical waveguide 28a and the second input optical waveguide 28b join together at a first MMI (Multi Mode Interference) 30, and branch to a first optical waveguide 32a and a second optical waveguide 32b. When a longitudinal direction of the Mach-Zehnder optical modulator 10 is assumed as an axis of symmetry, the first optical waveguide 32a is arranged at the same side as the first input end 26a, and the second optical waveguide 32b is arranged at the same side as the second input end 26b.

The first optical waveguide 32a and the second optical waveguide 32b join together at a second MMI 34 serving as a join- and branch portion, and branch to a first output optical waveguide 38a connected to a first output end 36a and a second output optical waveguide 38b connected to a second output end 36b. Although the phase difference is added to the lights propagated in the first optical waveguide 32a and the second optical waveguide 32b with the second MMI 34, this matter is omitted from the following description. When the longitudinal direction of the Mach-Zehnder optical modulator 10 is assumed as the axis of symmetry, the first output end 36a is arranged at the same side as the second optical waveguide 32b, and the second output end 36b is arranged at the same side as the first optical waveguide 32a. Between a light path length of the first optical waveguide 32a and a light path length of the second optical waveguide 32b, a difference is provided beforehand. For example, a light-path-length difference that adds the phase difference of −0.5π to the lights propagated in the first optical waveguide 32a and the second optical waveguide 32b is provided. That is, a phase shifter that adds the phase difference of −0.5π to the lights propagated in the first optical waveguide 32a and the second optical waveguide 32b is provided on the first optical waveguide 32a.

Each of phase adjustment electrodes 40 and each of modulation electrodes 42 are provided on each of the first optical waveguide 32a and the second optical waveguide 32b. The phase adjustment electrode 40 and the modulation electrode 42 are separated from each other. The positions of the phase adjustment electrode 40 and the modulation electrode 42 are not specially limited to FIG. 1, but here, the phase adjustment electrode 40 is arranged near the light input end, compared to the modulation electrode 42. Optical power detection electrodes 44 for detecting the power of the lights propagated in the first output optical waveguide 38a and the second output optical waveguide 38b are provided on the first output optical waveguide 38a and the second output optical waveguide 38b, respectively.

As illustrated in FIG. 2B, each of the modulation electrodes 42 is arranged on the upper cladding layer 18b via a contact layer 46. The contact layer 46 is made of a semiconductor such as InGaAs, for example. The passivation layer 22 and the insulating layer 24 are not provided between the upper cladding layer 18b and the contact layer 46. Similarly, the phase adjustment electrode 40 and the optical power detection electrode 44 are also arranged on the upper cladding layer 18b via the contact layer 46. The phase adjustment electrode 40, the modulation electrode 42 and the optical power detection electrode 44 are made of metal such as Au, for example.

Referring again to FIG. 1, a modulation voltage for modulating the lights propagated in the first optical waveguide 32a and the second optical waveguide 32b is applied to one end of each modulation electrode 42 with the drive circuit 14. A DC (Direct Current) bias voltage of a reverse bias is added to the modulation voltage to be applied to each modulation electrode 42. A terminating resistance 48 is connected to another end of each modulation electrode 42. When the modulation voltage is applied to each modulation electrode 42, a refractive index of the core 20 changes in the first optical waveguide 32a and the second optical waveguide 32b, and the phases of the lights propagated in the first optical waveguide 32a and the second optical waveguide 32b change.

The drive circuit 14 inputs a differential signal as a modulation signal to the modulation electrode 42 provided on the first optical waveguide 32a and the modulation electrode 42 provided on the second optical waveguide 32b. That is, when a voltage for driving at H (high) is applied to the modulation electrode 42 of the first optical waveguide 32a, a voltage for driving at L (low) is applied to the modulation electrode 42 of the second optical waveguide 32b. On the contrary, when the voltage for driving at L (low) is applied to the modulation electrode 42 of the first optical waveguide 32a, the voltage for driving at H (high) is applied to the modulation electrode 42 of the second optical waveguide 32b. Thus, since a difference in potential exists between the voltages applied to the modulation electrode 42 of the first optical waveguide 32a and the modulation electrode 42 of the second optical waveguide 32b, the phase difference according to the difference in potential is added to the lights propagated in the first optical waveguide 32a and the second optical waveguide 32b.

For example, when the voltage for driving at H (high) is applied to the modulation electrode 42 of the first optical waveguide 32a and the voltage for driving at L (low) is applied to the modulation electrode 42 of the second optical waveguide 32b, the phase difference of +0.5π is added to the lights propagated in the first optical waveguide 32a and the second optical waveguide 32b. In addition, for example, when the voltage for driving at L (low) is applied to the modulation electrode 42 of the first optical waveguide 32a and the voltage for driving at H (high) is applied to the modulation electrode 42 of the second optical waveguide 32b, the phase difference of −0.5π is added to the lights propagated in the first optical waveguide 32a and the second optical waveguide 32b.

As described above, the phase shifter that adds the phase difference of −0.5π to the lights to be propagated in the first optical waveguide 32a and the second optical waveguide 32b is provided on the first optical waveguide 32a in advance. Therefore, when the voltage for driving at H (high) is applied to the modulation electrode 42 of the first optical waveguide 32a and the voltage for driving at L (low) is applied to the modulation electrode 42 of the second optical waveguide 32b, the phase difference between the lights propagated in the first optical waveguide 32a and the second optical waveguide 32b is 0 (zero). On the contrary, when the voltage for driving at L (low) is applied to the modulation electrode 42 of the first optical waveguide 32a and the voltage for driving at H (high) is applied to the modulation electrode 42 of the second optical waveguide 32b, the phase difference between the lights propagated in the first optical waveguide 32a and the second optical waveguide 32b is −π. Thus, when the modulation voltage is applied to each modulation electrode 42 as the differential signal, the phase difference between the lights propagated in the first optical waveguide 32a and the second optical waveguide 32b alternately repeats 0 and −π.

When the phase difference between the lights propagated in the first optical waveguide 32a and the second optical waveguide 32b is 0, the light input from the first input end 26a is output from the first output end 36a and is not output from the second output end 36b. On the contrary, when the phase difference between the lights propagated in the first optical waveguide 32a and the second optical waveguide 32b is −π, the light input from the first input end 26a is output from the second output end 36b and is not output from the first output end 36a. Thus, the output end from which the light input from the first input end 26a is output is switched between the first output end 36a and the second output end 36b, according to the phase difference between the lights propagated in the first optical waveguide 32a and the second optical waveguide 32b. Thereby, an output light signal from the first output end 36a or the second output end 36b can be used as a modulation light signal. Here, the output light signal from the first output end 36a is used as the modulation light signal.

When the optical waveguides of the Mach-Zehnder optical modulator 10 are manufactured, manufacture variation may occur in the width and the length of the optical waveguides in no small part, and the light path lengths of the first optical waveguide 32a and the second optical waveguide 32b may deviate from a preset value. Thereby, the phase difference between the lights propagated in the first optical waveguide 32a and the second optical waveguide 32b may deviate from a preset value. A circuit performing the phase adjustment in order to adjust such deviation or shift of the phase difference is the phase adjustment circuit 12.

The phase adjustment circuit 12 applies a DC voltage which is a phase control signal to each phase adjustment electrode 40, changes the refractive index of the core 20 in the first optical waveguide 32a and the second optical waveguide 32b, and changes the phases of the lights propagated in the first optical waveguide 32a and the second optical waveguide 32b to perform the phase adjustment. Specifically, the phase adjustment circuit 12 performs a feedback control of the DC voltage applied to each phase adjustment electrode 40, based on optical power detected with each optical power detection electrode 44. When the phase difference between the lights propagated in the first optical waveguide 32a and the second optical waveguide 32b alternately repeats 0 and −π, the power of the light output from the first output end 36a and the power of the light output from the second output end 36b are the same as each other at constant time intervals. Therefore, the phase adjustment circuit 12 adjusts the DC voltage to be applied to each phase adjustment electrode 40 so that the optical power detected with the optical power detection electrode 44 of the first output optical waveguide 38a and the optical power detected with the optical power detection electrode 44 of the second output optical waveguide 38b are the same as each other. Thereby, the phase difference between the lights propagated in the first optical waveguide 32a and the second optical waveguide 32b can alternately repeat 0 and −π, and the deviation or shift of the phase difference by the manufacture variation can be corrected. As a method of the phase control, a control by current injection can be also performed in addition to the above-mentioned control by the DC voltage.

Here, a detailed description will be given of the phase adjustment by the phase adjustment circuit 12. First, definitions are given as follows. An amount of the phase shift caused by the manufacture variation of the optical waveguides is defined as an initial phase difference $\Delta\Phi_{OS}$. An amount of the phase shift caused by the phase shifter provided beforehand on the first optical waveguide 32a is defined as $\Phi_{PS}$. That is to say, the amount of the phase shift by the light-path-length difference provided beforehand between the light path lengths of the first optical waveguide 32a and the second optical waveguide 32b is defined as $\Phi_{PS}$. The light-path-length difference (i.e., the phase shifter) can be provided by physically changing the lengths of the first optical waveguide 32a and the second optical waveguide 32b. Moreover, the light-path-length difference can be provided by physically changing the widths of the first optical waveguide 32a and the second optical waveguide 32b. An amount of the phase shift caused by the DC voltage applied to the phase adjustment electrode 40 of the first optical waveguide 32a is defined as $\Phi_{DC1A}$. An amount of the phase shift caused by the DC voltage applied to the phase adjustment electrode 40 of the second optical waveguide 32b is defined as $\Phi_{DC2A}$. The DC bias voltage of the reverse bias is added to the modulation voltage to be applied to each modulation electrode 42. An amount of the phase shift caused by the DC bias voltage applied to the modulation electrode 42 of the first optical waveguide 32a is defined as $\Phi_{DC1B}$. An amount of the phase shift caused by the DC bias voltage applied to the modulation electrode 42 of the second optical waveguide 32b is defined as $\Phi_{DC2B}$.

Thereby, an amount $\Phi_{DC1}$ of the phase change caused by the DC voltage in the first optical waveguide 32a can be expressed as "$\Phi_{DC1}=\Phi_{PS}+\Phi_{DC1A}+\Phi_{DC1B}$". Similarly, an amount $\Phi_{DC2}$ of the phase change caused by the DC voltage in the second optical waveguide 32b can be expressed as "$\Phi_{DC2}=\Delta\Phi_{OS}+\Phi_{DC2}+\Phi_{DC2B}$". Since values of the DC bias voltages to be applied to the modulation electrodes 42 with the drive circuit 14 are generally the same as each other, the amount $\Phi_{DC1B}$ of the phase shift can be the same as the amount $\Phi_{DC2B}$ of the phase shift (i.e., $\Phi_{DC1B}=\Phi_{DC2B}$), and a difference between $\Phi_{DC1}$ and $\Phi_{DC2}$ can be expressed as "$\Phi_{DC1}-\Phi_{DC2}=(\Phi_{PS}+\Phi_{DC1A})-(\Delta\Phi_{OS}+\Phi_{DC2A})$".

Here, it is considered that the initial phase difference $\Delta\Phi_{OS}$ varies from −π to +π, and, for example, the amount $\Phi_{PS}$ of the phase shift is −0.5π. Therefore, a description will be given of the phase adjustment by the phase adjustment circuit 12 in such a case by a table 1. As described above, the phase difference of +0.5π is added to the lights propagated in the first optical waveguide 32a and the second optical waveguide 32b by applying the voltage for driving at H (high) to the modulation electrode 42 of the first optical waveguide 32a and applying the voltage for driving at L (low) to the modulation electrode 42 of the second optical waveguide 32b. On the contrary, the phase difference of −0.5π is added to the lights propagated in the first optical waveguide 32a and the second optical waveguide 32b by applying the voltage for driving at L (low) to the modulation electrode 42 of the first optical waveguide 32a and applying the voltage for driving at H (high) to the modulation electrode 42 of the second optical waveguide 32b. From this, if the difference "$(\Phi_{PS}+\Phi_{DC1A})-(\Delta\Phi_{OS}+\Phi_{DC2A})$" between the amount $\Phi_{DC1}$ of the phase change by the DC voltage in the first optical waveguide 32a and the amount $\Phi_{DC2}$ of the phase change by the DC voltage in the second optical waveguide 32b is −0.5π, the phase difference of the lights propagated in the first optical waveguide 32a and the second optical waveguide 32b can be alternately and repeatedly changed to one of 0 and −π.

As illustrated in the table 1, when the initial phase difference $\Delta\Phi_{OS}$ is between −π and 0, the phase adjustment circuit 12 applies the DC voltage causing the phase shift between −π and 0 so as to cancel the initial phase difference $\Delta\Phi_{OS}$, to the phase adjustment electrode 40 of the first optical waveguide 32a, so that the difference "$\Phi_{DC1}-\Phi_{DC2}$" can be −0.5π. Moreover, when the initial phase difference $\Delta\Phi_{OS}$ is between 0 and +π, the phase adjustment circuit 12 applies the DC voltage causing the phase shift between 0 and +π so as to cancel the initial phase difference $\Delta\Phi_{OS}$, to the phase adjustment electrode 40 of the second optical waveguide 32b, so that the difference "$\Phi_{DC1}-\Phi_{DC2}$" can be −0.5π. By such a control of the phase adjustment circuit 12, the phase difference of the lights propagated in the first optical waveguide 32a and the second optical waveguide 32b can be alternately and repeatedly changed to one of 0 and $-\pi$, and the output light signal from the first output end 36a can be used as the modulation light signal.

TABLE 1

| FIRST OPTICAL WAVEGUIDE | | SECOND OPTICAL WAVEGUIDE | | PHASE DIFFERENCE $(\Phi_{ps} + \Phi_{DC1A}) - (\Delta\Phi_{OS} + \Phi_{DC2A})$ |
|---|---|---|---|---|
| PHASE SHIFT AMOUNT $\Phi_{ps}$ | PHASE ADJUSTMENT $\Phi_{DC1A}$ | INITIAL PHASE DIFFERENCE $\Delta\Phi_{OS}$ | PHASE ADJUSTMENT $\Phi_{DC2A}$ | |
| $-0.5\pi$ | $-1.0\pi$ | $-1.0\pi$ | 0 | $-0.5\pi$ |
| $-0.5\pi$ | $-0.9\pi$ | $-0.9\pi$ | 0 | $-0.5\pi$ |
| $-0.5\pi$ | $-0.8\pi$ | $-0.8\pi$ | 0 | $-0.5\pi$ |
| $-0.5\pi$ | $-0.7\pi$ | $-0.7\pi$ | 0 | $-0.5\pi$ |
| $-0.5\pi$ | $-0.6\pi$ | $-0.6\pi$ | 0 | $-0.5\pi$ |
| $-0.5\pi$ | $-0.5\pi$ | $-0.5\pi$ | 0 | $-0.5\pi$ |
| $-0.5\pi$ | $-0.4\pi$ | $-0.4\pi$ | 0 | $-0.5\pi$ |
| $-0.5\pi$ | $-0.3\pi$ | $-0.3\pi$ | 0 | $-0.5\pi$ |
| $-0.5\pi$ | $-0.2\pi$ | $-0.2\pi$ | 0 | $-0.5\pi$ |
| $-0.5\pi$ | $-0.1\pi$ | $-0.1\pi$ | 0 | $-0.5\pi$ |
| $-0.5\pi$ | 0 | 0 | 0 | $-0.5\pi$ |
| $-0.5\pi$ | 0 | $0.1\pi$ | $-0.1\pi$ | $-0.5\pi$ |
| $-0.5\pi$ | 0 | $0.2\pi$ | $-0.2\pi$ | $-0.5\pi$ |
| $-0.5\pi$ | 0 | $0.3\pi$ | $-0.3\pi$ | $-0.5\pi$ |
| $-0.5\pi$ | 0 | $0.4\pi$ | $-0.4\pi$ | $-0.5\pi$ |
| $-0.5\pi$ | 0 | $0.5\pi$ | $-0.5\pi$ | $-0.5\pi$ |
| $-0.5\pi$ | 0 | $0.6\pi$ | $-0.6\pi$ | $-0.5\pi$ |
| $-0.5\pi$ | 0 | $0.7\pi$ | $-0.7\pi$ | $-0.5\pi$ |
| $-0.5\pi$ | 0 | $0.8\pi$ | $-0.8\pi$ | $-0.5\pi$ |
| $-0.5\pi$ | 0 | $0.9\pi$ | $-0.9\pi$ | $-0.5\pi$ |
| $-0.5\pi$ | 0 | $1.0\pi$ | $-1.0\pi$ | $-0.5\pi$ |

However, in the control of the phase adjustment circuit 12 as described above, when the initial phase difference $\Delta\Phi_{OS}$ varies between $-\pi$ and $+\pi$, the amount of the phase adjustment is a range between 0 and $-\pi$. To increase the amount of the phase adjustment, it is required to lengthen the phase adjustment electrodes 40 or increase the voltages to be applied to the phase adjustment electrodes 40, but these cause increase of the propagation loss of the lights. Therefore, in the following, a description will be given of embodiments that can restrain the propagation loss of the lights from increasing, and adjust the phase difference between the lights propagated in the first optical waveguide 32a and the second optical waveguide 32b.

First Embodiment

Figure 3:
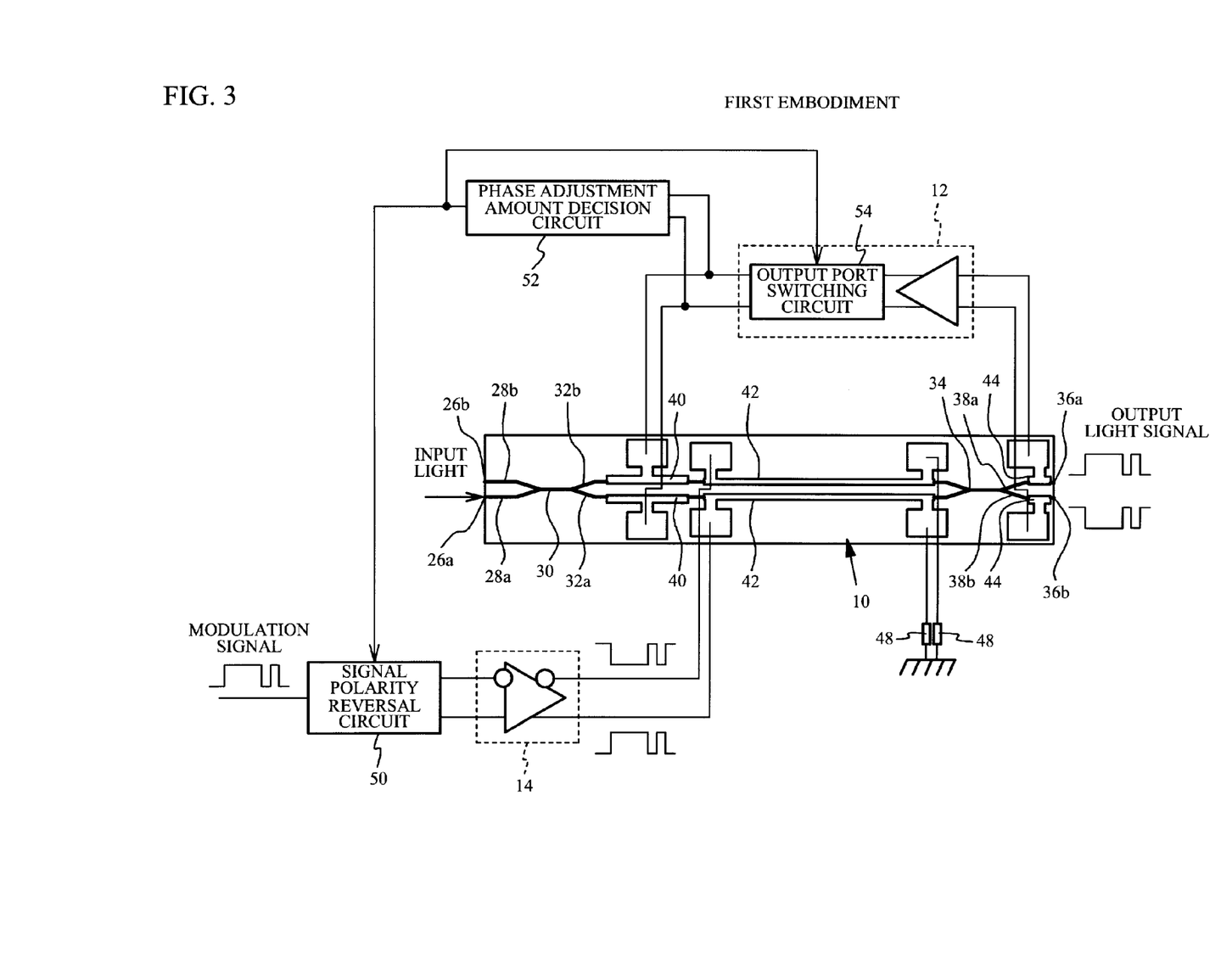
FIG. 3 is a schematic top view of an optical modulation apparatus according to a first embodiment.

FIG. 3 is a schematic top view of an optical modulation apparatus according to a first embodiment. As illustrated in FIG. 3, the optical modulation apparatus according to the first embodiment mainly includes the Mach-Zehnder optical modulator 10, the phase adjustment circuit 12 having an output port switching circuit 54, the drive circuit 14, a signal polarity reversal circuit 50, and a phase adjustment amount decision circuit 52. Since the Mach-Zehnder optical modulator 10 of the first embodiment is the same as that of the comparative example 1, a description thereof is omitted.

The phase adjustment circuit 12 applies the DC voltage that is the phase control signal to the phase adjustment electrode 40 selected by the output port switching circuit 54 to perform the phase adjustment for correcting the shift of the phase difference. Specifically, the phase adjustment circuit 12 applies the DC voltage to the phase adjustment electrode 40 selected by the output port switching circuit 54 so that the optical power detected with the optical power detection electrodes 44 are the same as each other. When an absolute value of the amount of the phase adjustment corresponding to any one of the first optical waveguide 32a or the second optical waveguide 32b exceeds a given value, the output port switching circuit 54 switches the phase adjustment electrode 40 to which the DC voltage as the phase control signal is applied, from any one of the phase adjustment electrode 40 of the first optical waveguide 32a or the phase adjustment electrode 40 of the second optical waveguide 32b to another one. That is, the output port switching circuit 54 selects a switching destination.

The drive circuit 14 applies the modulation voltage to which the DC bias voltage is added, to the modulation electrodes 42 provided on the first optical waveguide 32a and the second optical waveguide 32b. The drive circuit 14 inputs a modulation signal to be output to the modulation electrode 42 of the first optical waveguide 32a, and a modulation signal to be output to the modulation electrode 42 of the second optical waveguide 32b, as the differential signal.

When the absolute value of the amount of the phase adjustment by the phase adjustment circuit 12 exceeds the given value, the signal polarity reversal circuit 50 reverses a signal polarity of the differential signal to be output from the drive circuit 14.

The phase adjustment amount decision circuit 52 decides whether the absolute value of the amount of the phase adjustment by the phase adjustment circuit 12 exceeds the given value. When it is decided that the absolute value of the amount of the phase adjustment by the phase adjustment circuit 12 exceeds the given value, the phase adjustment amount decision circuit 52 notifies the phase adjustment circuit 12 and the signal polarity reversal circuit 50 that the absolute value of the amount of the phase adjustment by the phase adjustment circuit 12 exceeds the given value.

Figure 4:
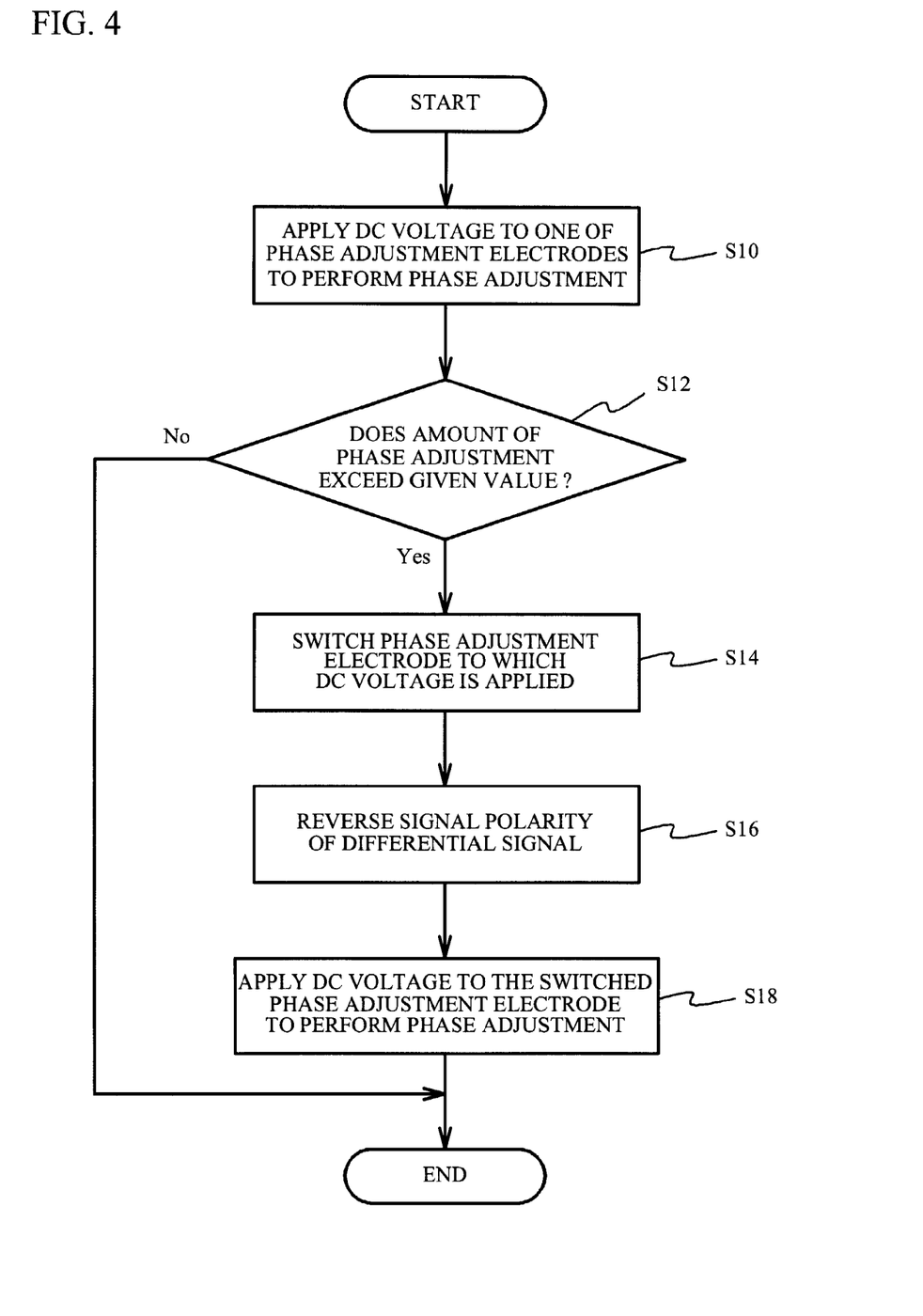
FIG. 4 is a flowchart illustrating the control of the optical modulation apparatus according to the first embodiment.

Here, a description will be given of the control of the optical modulation apparatus according to the first embodiment. FIG. 4 is a flowchart illustrating a method for controlling the optical modulation apparatus according to the first embodiment. A table 2 illustrates the phase adjustment for correcting the initial phase difference $\Delta\Phi_{OS}$. To correct the shift of the phase difference, the phase adjustment circuit 12 applies the DC voltage to any one of the phase adjustment electrodes 40 of the first optical waveguide 32a and the second optical waveguide 32b to perform the phase adjustment (step S10).

The phase adjustment circuit 12 performs the phase adjustment by changing the DC voltage to be applied to any one of the phase adjustment electrodes 40 of the first optical waveguide 32a and the second optical waveguide 32b by a step of $\Delta V$. Then, when the power of the lights propagated in the first output optical waveguide 38a and the second output optical waveguide 38b are the same as each other, the phase adjustment is completed. The $\Delta V$ can be set to any voltage, and it is desirable that the $\Delta V$ is a small voltage to perform the phase adjustment with more high accuracy. Moreover, it is desirable that the DC voltage to be added is started from 0V in the phase adjustment.

Next, the phase adjustment amount decision circuit 52 decides whether the absolute value of the amount of the phase adjustment by the phase adjustment circuit 12 exceeds the given value (step S12). The given value can be set to any value between 0 and $\pi$, and is $0.5\pi$ in the first embodiment, for example. As described in the comparative example 1, if the difference "$(\Phi_{PS}+\Phi_{DC1A})-(\Delta\Phi_{OS}+\Phi_{DC2A})$" between $\Phi_{DC1}$ and $\Phi_{DC2}$ is $-0.5\pi$, the phase difference of the lights propagated in the first optical waveguide 32a and the second optical waveguide 32b can be alternately and repeatedly changed to one of 0 and $-\pi$. Thereby, in comparative example 1, when the initial phase difference $\Delta\Phi_{OS}$ is between $-\pi$ and 0 as illustrated in the table 1, the DC voltage is applied to the phase adjustment electrode 40 of the first optical waveguide 32a, so that the phase change from $-\pi$ to 0 is caused to cancel the initial phase difference $\Delta\Phi_{OS}$. In addition, when the initial phase difference $\Delta\Phi_{OS}$ is between $+\pi$ and 0, the DC voltage is applied to the phase adjustment electrode 40 of the second optical waveguide 32b, so that the phase change from $+\pi$ to 0 is caused to cancel the initial phase difference $\Delta\Phi_{OS}$. However, in this method, when an absolute value of the initial phase difference $\Delta\Phi_{OS}$ is larger than $0.5\pi$, the absolute value of the amount of the phase adjustment by the phase adjustment circuit 12 exceeds $0.5\pi$. Therefore, in such a case, the phase adjustment amount decision circuit 52 decides that the absolute value of the amount of the phase adjustment exceeds the given value in the first embodiment, and notifies the phase adjustment circuit 12 and the signal polarity reversal circuit 50 that the absolute value of the amount of the phase adjustment exceeds the given value.

The output port switching circuit 54, which has been notified that the absolute value of the amount of the phase adjustment exceeds the given value, selectively switches the phase adjustment electrode 40 to which the DC voltage is applied, from any one of the phase adjustment electrodes 40 of the first optical waveguide 32a and the second optical waveguide 32b to another one (step S14). For example, when the absolute value of the initial phase difference $\Delta\Phi_{OS}$ is more than $0.5\pi$ and the absolute value of the amount of the phase adjustment exceeds $0.5\pi$ as illustrated in the table 2, the output port switching circuit 54 selectively switches the phase adjustment electrode 40 to which the DC voltage is applied, to another one.

Next, the signal polarity reversal circuit 50, which has been notified that the absolute value of the amount of the phase adjustment exceeds the given value, reverses the signal polarity of the differential signal to be output from the drive circuit 14 (step S16). For example, when the absolute value of the initial phase difference $\Delta\Phi_{OS}$ is more than $0.5\pi$ and the absolute value of the amount of the phase adjustment exceeds $0.5\pi$ as illustrated in the table 2, the signal polarity reversal circuit 50 reverses the signal polarity of the differential signal to be output from the drive circuit 14.

Next, the phase adjustment circuit 12 applies the DC voltage to the phase adjustment electrode 40 switched with the output port switching circuit 54 to perform the phase adjustment (step S18). As is the case with step S10, the phase adjustment circuit 12 performs the phase adjustment by changing the DC voltage to be applied from 0V by a step of $\Delta V$. Then, when the power of the lights propagated in the first output optical waveguide 38a and the second output optical waveguide 38b are the same as each other, the phase adjustment is completed. Here, the differential signal to be output from the drive circuit 14 is reversed with the signal polarity reversal circuit 50. Therefore, to make the logic of the output light signal output from the first output end 36a correspond with the logic of the modulation signal, it is required that the difference "$(\Phi_{PS}+\Phi_{DC1A})-(\Delta\Phi_{OS}+\Phi_{DC2A})$" between $\Phi_{DC1}$ and $\Phi_{DC2}$ is $+0.5\pi$ or $-1.5\pi$ shifted from $-0.5\pi$ by $+\pi$ or $-\pi$.

Figure 5:
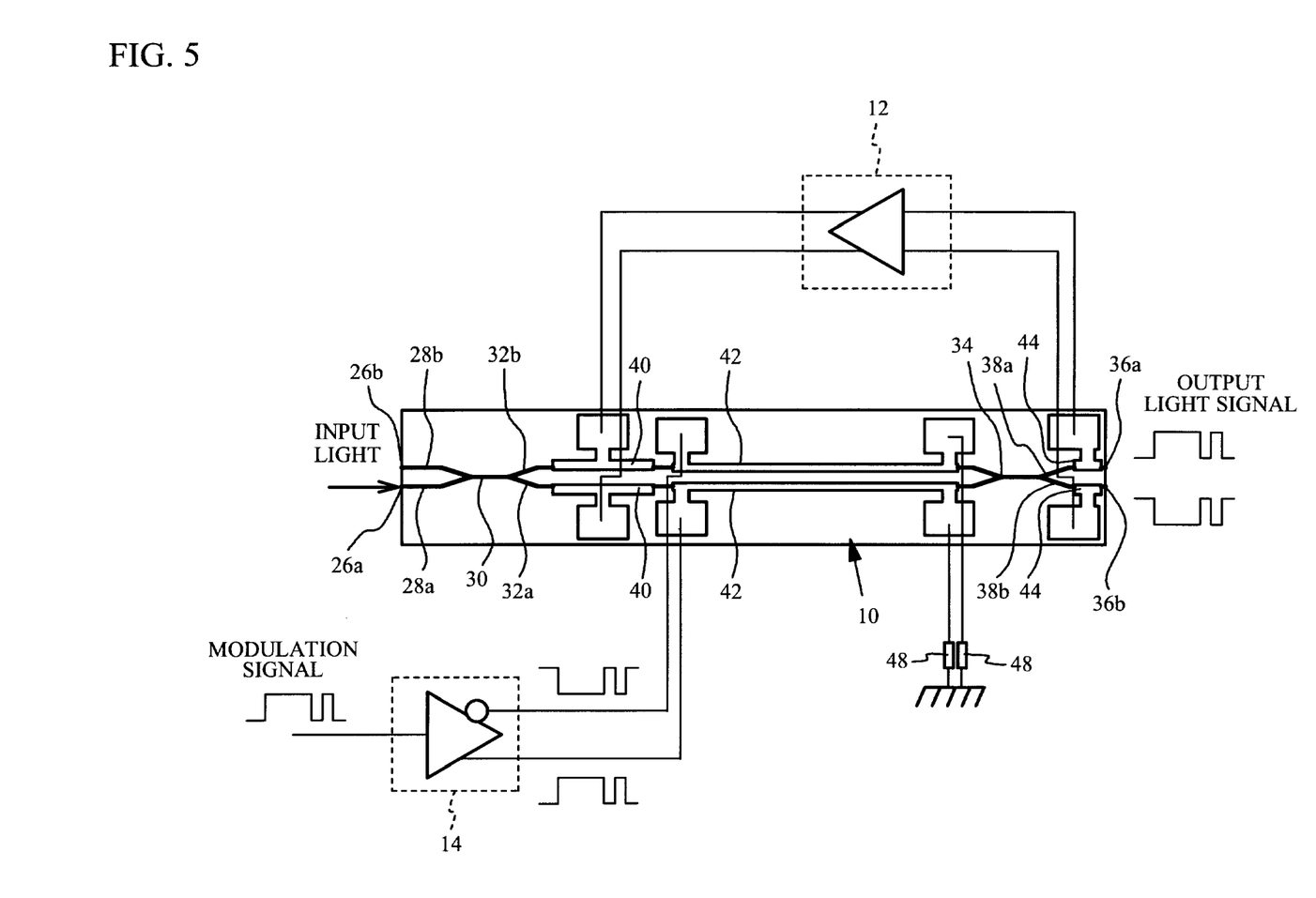
FIG. 5 is a schematic diagram illustrating a relationship between a logic of an output light signal and a logic of a modulation signal when a difference between $\Phi_{DC1}$ and $\Phi_{DC2}$ is $-0.5\pi$.
Figure 6:
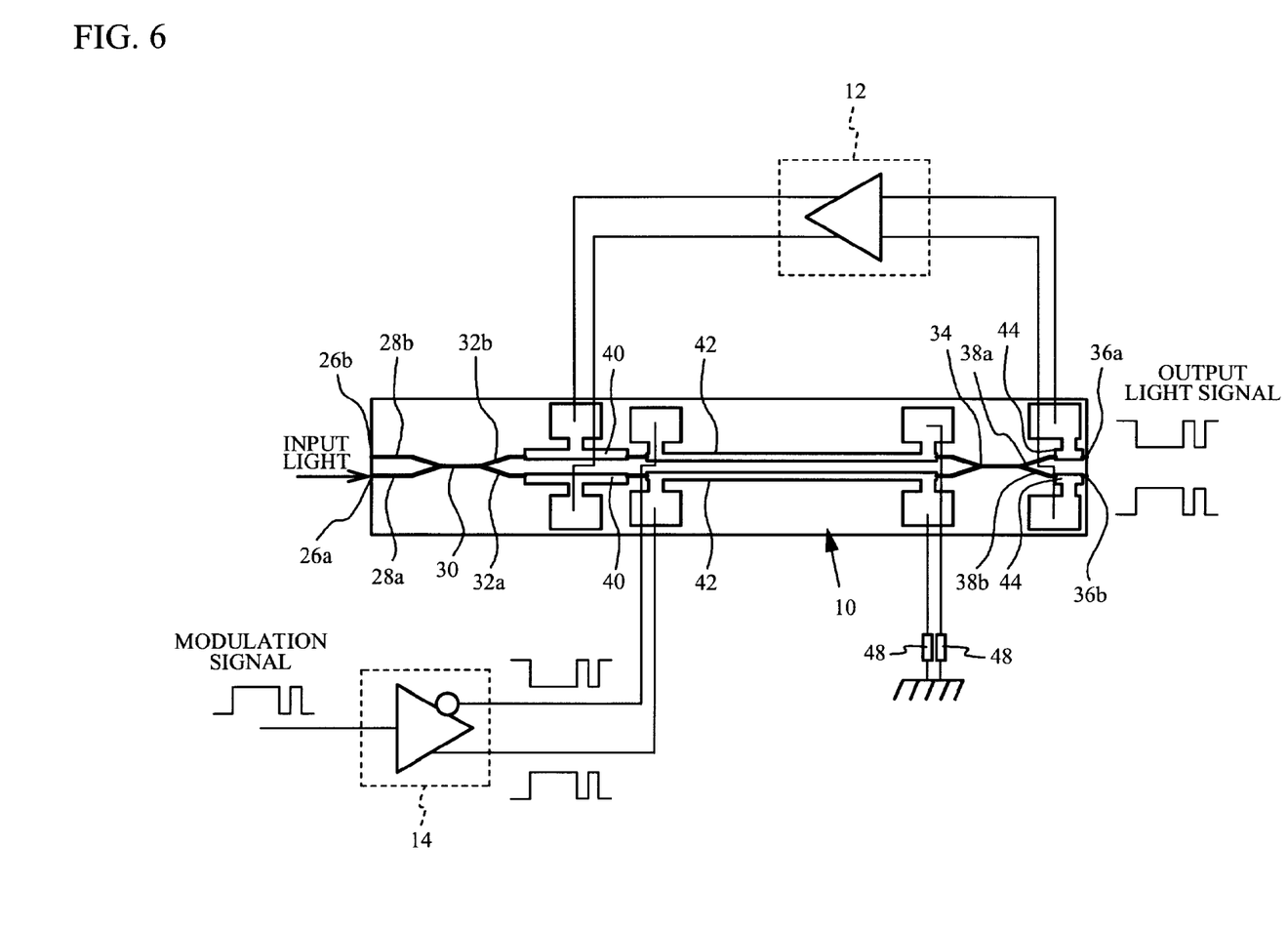
FIG. 6 is a schematic diagram illustrating a relationship between the logic of the output light signal and the logic of the modulation signal when the difference between $\Phi_{DC1}$ and $\Phi_{DC2}$ is $+0.5\pi$ or $-1.5\pi$.

A description will be given of what kind of relationship the logic of an output light signal and the logic of the modulation signal become by shifting the difference between $\Phi_{DC1}$ and $\Phi_{DC2}$ by $+\pi$ or $-\pi$, with the use of FIGS. 5 and 6. FIG. 5 is a schematic diagram illustrating a relationship between the logic of the output light signal and the logic of the modulation signal when the difference between $\Phi_{DC1}$ and $\Phi_{DC2}$ is $-0.5\pi$. FIG. 6 is a schematic diagram illustrating a relationship between the logic of the output light signal and the logic of the modulation signal when the difference between $\Phi_{DC1}$ and $\Phi_{DC2}$ is $+0.5\pi$ or $-1.5\pi$. When the difference between $\Phi_{DC1}$ and $\Phi_{DC2}$ is $-0.5\pi$ as illustrated in FIG. 5, the logic of the output light signal and the logic of the modulation signal are identical with each other. On the contrary, when the difference between $\Phi_{DC1}$ and $\Phi_{DC2}$ is $+0.5\pi$ or $-1.5\pi$ as illustrated in FIG. 6, the logic of the output light signal output from the first output end 36a is reversed against the logic of the modulation signal.

From this, when the differential signal to be output from the drive circuit 14 is reversed with the signal polarity reversal circuit 50, the difference between $\Phi_{DC1}$ and $\Phi_{DC2}$ is set to $+0.5\pi$ or $-1.5\pi$, to thereby make the logic of the output light signal output from the first output end 36a correspond with the logic of the modulation signal.

When the initial phase difference $\Delta\Phi_{OS}$ is between $-\pi$ and $-0.6\pi$, the phase adjustment electrode 40 to which the DC voltage is applied is switched from the phase adjustment electrode 40 of the first optical waveguide 32a to the phase adjustment electrode 40 of the second optical waveguide 32b, so that the difference between $\Phi_{DC1}$ and $\Phi_{DC2}$ can be $+0.5\pi$ when the amount of the phase adjustment is within a range from 0 to $-0.4\pi$. On the contrary, when the initial phase difference $\Delta\Phi_{OS}$ is between $+0.6\pi$ and $+\pi$, the phase adjustment electrode 40 to which the DC voltage is applied is switched from the phase adjustment electrode 40 of the second optical waveguide 32b to the phase adjustment electrode 40 of the first optical waveguide 32a, so that the difference between $\Phi_{DC1}$ and $\Phi_{DC2}$ can be $-1.5\pi$ when the range of the phase adjustment is within a range from 0 to $-0.4\pi$. Thus, even when the initial phase difference $\Delta\Phi_{OS}$ varies between $-\pi$ and $+\pi$ in the optical modulation apparatus according to the first embodiment, the amount of the phase adjustment by the phase adjustment circuit 12 can be limited within the range from 0 to $-0.5\pi$.

TABLE 2

| FIRST OPTICAL WAVEGUIDE | | SECOND OPTICAL WAVEGUIDE | | PHASE | | |
|---|---|---|---|---|---|---|
| PHASE SHIFT AMOUNT $\phi_{ps}$ | PHASE ADJUSTMENT $\phi_{DC1A}$ | INITIAL PHASE DIFFERENCE $\Delta\phi_{OS}$ | PHASE ADJUSTMENT $\phi_{DC2A}$ | DIFFERENCE $(\phi_{ps}+\phi_{DC1A})-(\Delta\phi_{OS}+\phi_{DC2A})$ | SIGNAL LOGIC | SIGNAL POLARITY REVERSAL |
| $-0.5\pi$ | 0 | $-1.0\pi$ | 0 | $0.5\pi$ | NEGATIVE LOGIC | YES |
| $-0.5\pi$ | 0 | $-0.9\pi$ | $-0.1\pi$ | $0.5\pi$ | NEGATIVE LOGIC | YES |
| $-0.5\pi$ | 0 | $-0.8\pi$ | $-0.2\pi$ | $0.5\pi$ | NEGATIVE LOGIC | YES |

TABLE 2-continued

| FIRST OPTICAL WAVEGUIDE | | SECOND OPTICAL WAVEGUIDE | | | | |
|---|---|---|---|---|---|---|
| PHASE SHIFT AMOUNT $\phi_{ps}$ | PHASE ADJUSTMENT $\phi_{DC1A}$ | INITIAL PHASE DIFFERENCE $\Delta\phi_{OS}$ | PHASE ADJUSTMENT $\phi_{DC2A}$ | DIFFERENCE $(\phi_{ps}+\phi_{DC1A})-(\Delta\phi_{OS}+\phi_{DC2A})$ | SIGNAL LOGIC | SIGNAL POLARITY REVERSAL |
| $-0.5\pi$ | 0 | $-0.7\pi$ | $-0.3\pi$ | $0.5\pi$ | NEGATIVE LOGIC | YES |
| $-0.5\pi$ | 0 | $-0.6\pi$ | $-0.4\pi$ | $0.5\pi$ | NEGATIVE LOGIC | YES |
| $-0.5\pi$ | $-0.5\pi$ | $-0.5\pi$ | 0 | $-0.5\pi$ | POSITIVE LOGIC | |
| $-0.5\pi$ | $-0.4\pi$ | $-0.4\pi$ | 0 | $-0.5\pi$ | POSITIVE LOGIC | |
| $-0.5\pi$ | $-0.3\pi$ | $-0.3\pi$ | 0 | $-0.5\pi$ | POSITIVE LOGIC | |
| $-0.5\pi$ | $-0.2\pi$ | $-0.2\pi$ | 0 | $-0.5\pi$ | POSITIVE LOGIC | |
| $-0.5\pi$ | $-0.1\pi$ | $-0.1\pi$ | 0 | $-0.5\pi$ | POSITIVE LOGIC | |
| $-0.5\pi$ | 0 | 0 | 0 | $-0.5\pi$ | POSITIVE LOGIC | |
| $-0.5\pi$ | 0 | $0.1\pi$ | $-0.1\pi$ | $-0.5\pi$ | POSITIVE LOGIC | |
| $-0.5\pi$ | 0 | $0.2\pi$ | $-0.2\pi$ | $-0.5\pi$ | POSITIVE LOGIC | |
| $-0.5\pi$ | 0 | $0.3\pi$ | $-0.3\pi$ | $-0.5\pi$ | POSITIVE LOGIC | |
| $-0.5\pi$ | 0 | $0.4\pi$ | $-0.4\pi$ | $-0.5\pi$ | POSITIVE LOGIC | |
| $-0.5\pi$ | 0 | $0.5\pi$ | $-0.5\pi$ | $-0.5\pi$ | POSITIVE LOGIC | |
| $-0.5\pi$ | $-0.4\pi$ | $0.6\pi$ | 0 | $-1.5\pi$ | NEGATIVE LOGIC | YES |
| $-0.5\pi$ | $-0.3\pi$ | $0.7\pi$ | 0 | $-1.5\pi$ | NEGATIVE LOGIC | YES |
| $-0.5\pi$ | $-0.2\pi$ | $0.8\pi$ | 0 | $-1.5\pi$ | NEGATIVE LOGIC | YES |
| $-0.5\pi$ | $-0.1\pi$ | $0.9\pi$ | 0 | $-1.5\pi$ | NEGATIVE LOGIC | YES |
| $-0.5\pi$ | 0 | $1.0\pi$ | 0 | $-1.5\pi$ | NEGATIVE LOGIC | YES |

As described above, the optical modulation apparatus according to the first embodiment includes the Mach-Zehnder optical modulator 10, the phase adjustment circuit 12, the drive circuit 14, the signal polarity reversal circuit 50. The phase adjustment circuit 12 outputs the phase control signal to the phase adjustment electrodes 40 provided on the first optical waveguide 32a and the second optical waveguide 32b, and includes a function for switching the phase control signal between the phase adjustment electrodes 40 provided on the first optical waveguide 32a and the second optical waveguide 32b. That is, the phase adjustment circuit 12 switches the DC voltage that is the phase control signal, between the phase adjustment electrodes 40 provided on the first optical waveguide 32a and the second optical waveguide 32b to adjust the phase difference between the lights propagated in the first optical waveguide 32a and the second optical waveguide 32b. The signal polarity reversal circuit 50 reverses the polarity of the differential signal to be output from the drive circuit 14. The optical modulation apparatus includes such a Mach-Zehnder optical modulator 10 and such a signal polarity reversal circuit 50, and it is therefore possible to perform the control for switching between the phase adjustment electrodes 40 the phase control signal to be output to the phase adjustment electrodes 40 provided on the first optical waveguide 32a and the second optical waveguide 32b, on the Mach-Zehnder optical modulator 10. Moreover, it is possible to perform the control for reversing the polarity of the modulation signal composed of the differential signal that modulates the lights propagated in the first optical waveguide 32a and the second optical waveguide 32b. Thereby, as described in the table 2, the amount of the phase adjustment by the phase adjustment circuit 12 can be reduced, compared to the comparative example 1. It is therefore possible to restrain the DC voltage to be applied to the phase adjustment electrode 40 from increasing, restrain the propagation loss of the lights and perform the phase adjustment. In addition, it is possible to make the logic of the output light signal used as the modulation light signal correspond with the logic of the modulation signal, as illustrated in FIGS. 5 and 6.

In the first embodiment, when the absolute value of the amount of the phase adjustment corresponding to any one of the first optical waveguide 32a and the second optical waveguide 32b by the phase adjustment circuit 12 exceeds $0.5\pi$, the phase adjustment circuit 12 switches the phase adjustment electrode 40 inputting the phase control signal, and the signal polarity reversal circuit 50 reverses the polarity of the differential signal. However, the first embodiment is not limited to this. The absolute value of the amount of phase adjustments in timing which switches the phase adjustment electrode 40, and the absolute value of the amount of phase adjustments in timing which reverses the polarity of the differential signal can be set to a given value arbitrarily defined between 0 and π. That is, when the absolute value of the amount of the phase adjustment corresponding to any one of the first optical waveguide 32a and the second optical waveguide 32b by the phase adjustment circuit 12 exceeds the given value, the phase adjustment circuit 12 may switch the phase adjustment electrode 40 inputting the phase control signal, and the signal polarity reversal circuit 50 may reverse the polarity of the differential signal. However, it is desirable that the phase adjustment circuit 12 switches the phase adjustment electrode 40 inputting the phase control signal when the absolute value of the amount of the phase adjustment exceeds 0.5π. In addition, it is desirable that the signal polarity reversal circuit 50 also reverses the polarity of the differential signal in conjunction with the switching of the phase adjustment electrode 40 when the absolute value of the amount of the phase adjustment exceeds 0.5π. Thereby, the amount of the phase adjustment by the phase adjustment circuit 12 can be further reduced. In addition, it is possible to make the logic of the output light signal used as the modulation light signal correspond with the logic of the modulation signal.

As described in the first embodiment, it is desirable that the optical modulation apparatus includes the phase adjustment amount decision circuit 52 that decides the amount of the phase adjustment by the phase adjustment circuit 12, and notifies, when the absolute value of the amount of the phase adjustment exceeds the given value in the first embodiment, the phase adjustment circuit 12 and the signal polarity reversal circuit 50 that the absolute value of the amount of the phase adjustment exceeds the given value. Thereby, it is possible to determine the amount of the phase adjustment corresponding to any one of the first optical waveguide 32a and the second optical waveguide 32b by the phase adjustment circuit 12 as needed. Further, it is possible to change the switching of the phase adjustment electrode 40 inputting the phase control signal by the phase adjustment circuit 12, and existence or nonexistence of the polarity reversal of the differential signal by the signal polarity reversal circuit 50, as needed.

In the first embodiment, a description is given of the optical modulation apparatus including the Mach-Zehnder optical modulator 10, the phase adjustment circuit 12, the drive circuit 14 and the signal polarity reversal circuit 50. Here, the phase adjustment circuit 12, the drive circuit 14 and the signal polarity reversal circuit 50 function as a controller that controls the Mach-Zehnder optical modulator 10.

In the first embodiment, the light-path-length difference between the light path lengths of the first optical waveguide 32a and the second optical waveguide 32b is provided beforehand, and the amount $\Phi_{PS}$ of the phase shift is provided beforehand. However, the first embodiment is not limited to this. The light path lengths of the first optical waveguide 32a and the second optical waveguide 32b may be the same as each other, and the amount $\Phi_{PS}$ of the phase shift may be set to 0. However, the amount $\Phi_{PS}$ of the phase shift is provided beforehand, so that the difference in potential between H (high) and L (low) of the modulation signals output to the modulation electrodes 42 by the drive circuit 14 can be reduced.

In the first embodiment, the Mach-Zehnder optical modulator 10 includes the two input optical waveguides, but is not limited to this. Even when the Mach-Zehnder optical modulator 10 includes a single input optical waveguide, the same method as described above is applicable. In the first embodiment, in order to perform the phase adjustment, the phase adjustment circuit 12 applies the DC voltage to the selected phase adjustment electrode 40 so that the optical power detected with the optical power detection electrodes 44 are the same as each other. However, a method for performing the phase adjustment is not limited to this, and the phase adjustment may be performed by another method.

In the first embodiment, when the absolute value of the amount of the phase adjustment exceeds the given value, the phase adjustment electrode 40 to which the DC voltage is applied is switched, and the polarity of the differential signal is reversed. However, the first embodiment is not limited to this. For example, the voltages to be applied to the phase adjustment electrodes 40 of the first optical waveguide 32a and the second optical waveguide 32b are swept, and a smaller one of absolute values of the voltages in which the power of the lights propagated in the first output optical waveguide 38a and the second output optical waveguide 38b are the same as each other may be used.

Second Embodiment

The optical modulation apparatus according to the first embodiment may cause a case where the logic of the output light signal used as the modulation light signal is matched with the logic of the modulation signal in a reversal state. Therefore, a second embodiment describes a case where the optical modulation apparatus can make the logic of the output light signal used as the modulation light signal correspond with the logic of the modulation signal.

Figure 7:
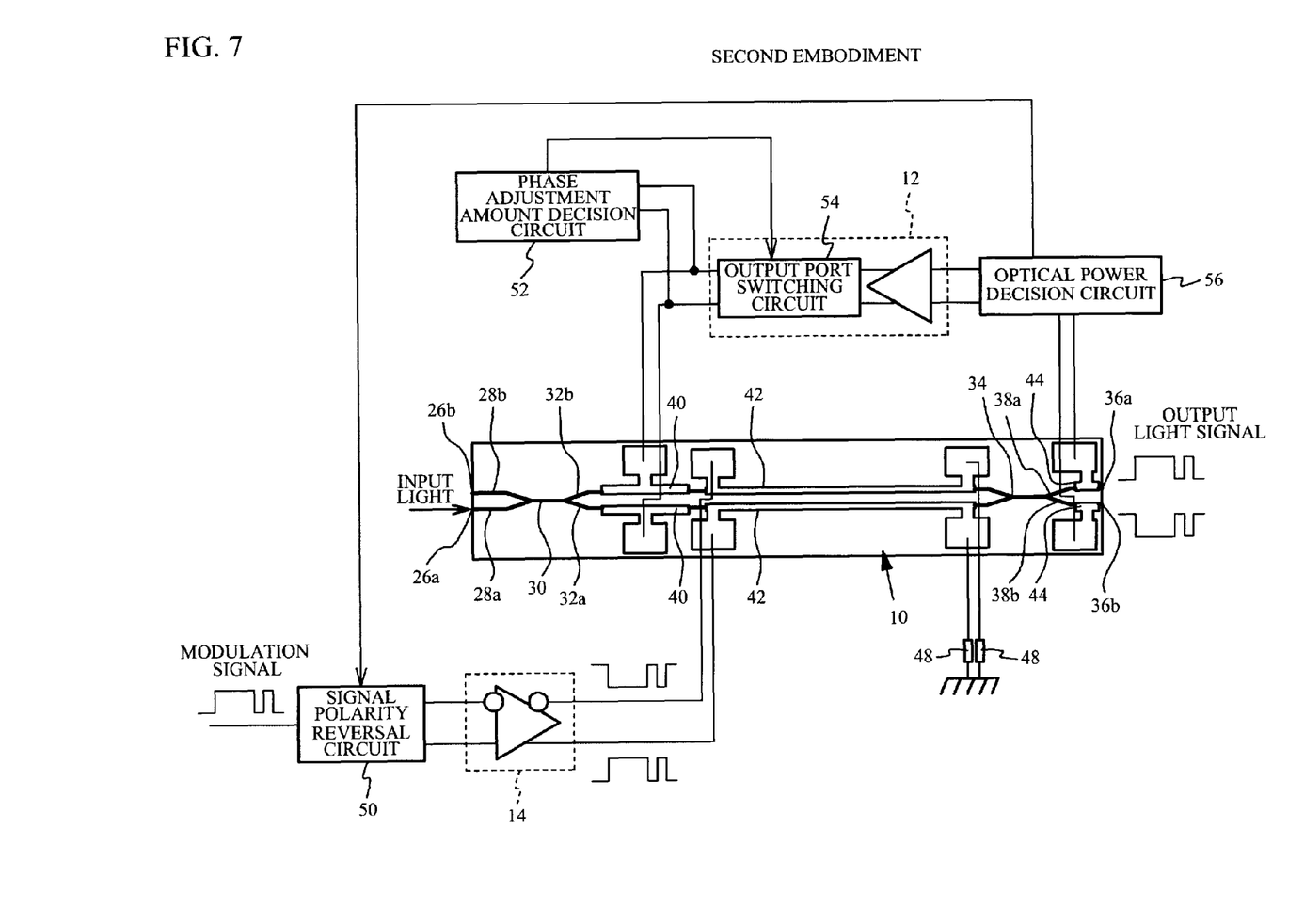
FIG. 7 is a schematic top view of the optical modulation apparatus according to a second embodiment.

FIG. 7 is a schematic top view of the optical modulation apparatus according to the second embodiment. As illustrated in FIG. 7, the optical modulation apparatus according to the second embodiment further includes an optical power decision circuit 56 that decides an optical power detected with each optical power detection electrode 44. The optical power decision circuit 56 decides whether the power of the lights propagated in the first output optical waveguide 38a and the second output optical waveguide 38b are the same as each other, based on the optical power detected with each optical power detection electrode 44. In addition, the optical power decision circuit 56 decides what kind of variation tendency the power of the lights propagated in the first output optical waveguide 38a and the second output optical waveguide 38b are, by the phase adjustment of the phase adjustment circuit 12, and notifies the signal polarity reversal circuit 50 of the variation tendency. Since other configurations are the same as the optical modulation apparatus of the first embodiment in FIG. 3, a description thereof is omitted here.

Figure 8:
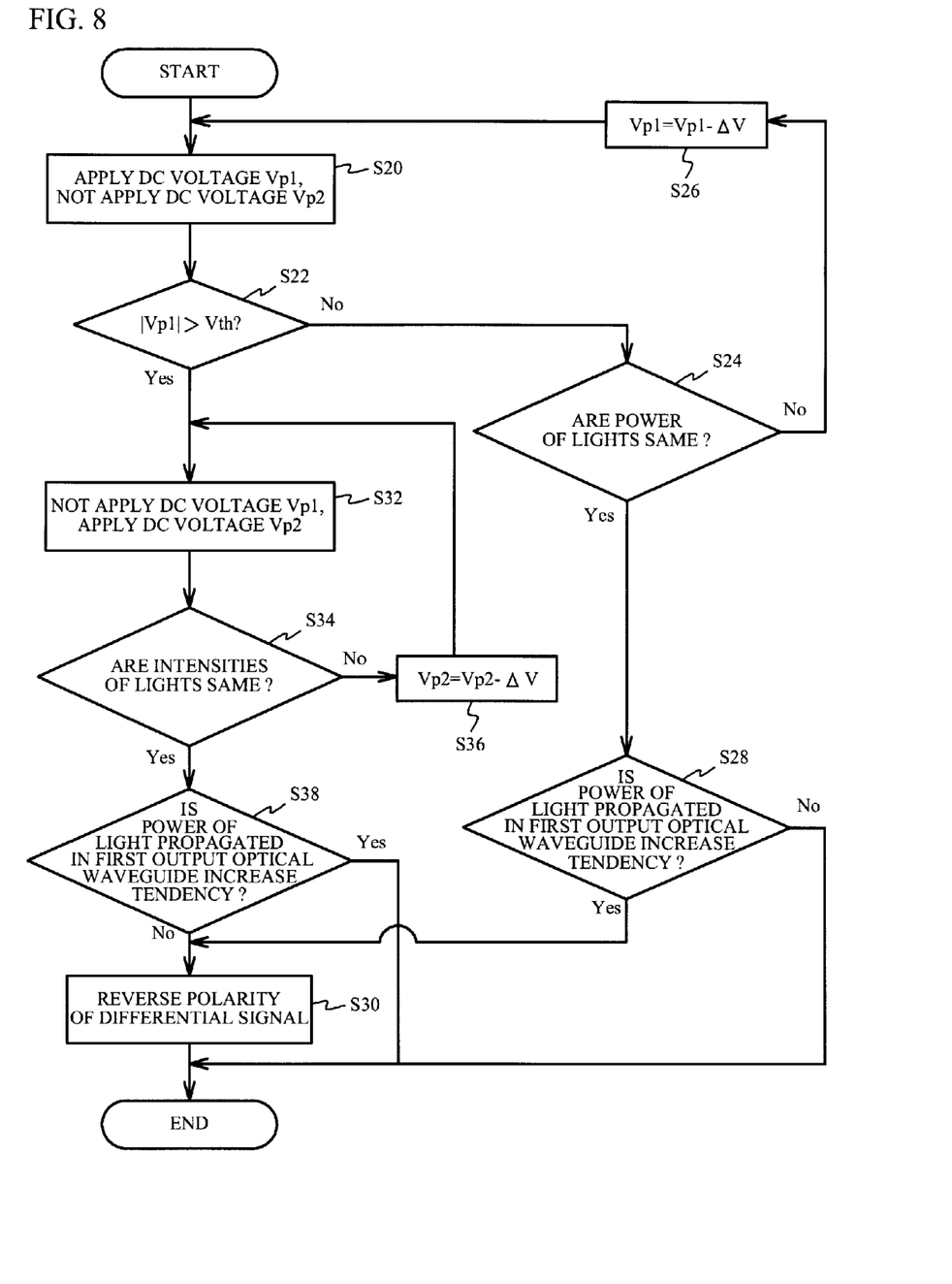
FIG. 8 is a flowchart illustrating the control of the optical modulation apparatus according to the second embodiment.

FIG. 8 is a flowchart illustrating a method for controlling the optical modulation apparatus according to the second embodiment. In FIG. 8, the phase adjustment circuit 12 applies a DC voltage Vp1 to the phase adjustment electrode 40 of the first optical waveguide 32a to perform the phase adjustment without applying a DC voltage Vp2 to the phase adjustment electrode 40 of the second optical waveguide 32b (step S20).

Next, the phase adjustment amount decision circuit 52 decides whether an absolute value of the DC voltage Vp1 applied to the phase adjustment electrode 40 of the first optical waveguide 32a exceeds a given threshold Vth (step S22). Here, the given threshold Vth can be set as a voltage in which the absolute value of the mount of the phase adjustment by the phase adjustment circuit 12 is 0.5π. When it is decided in step S22 that the absolute value of the DC voltage Vp1 does not exceed the given threshold Vth (NO), the optical power decision circuit 56 decides whether the power of the lights propagated in the first output optical waveguide 38a and the second output optical waveguide 38b are the same as each other (step S24).

When it is decided in step S24 that the power of the lights are not the same as each other (NO), the phase adjustment circuit 12 changes the DC voltage Vp1 applied to the phase adjustment electrode 40 of the first optical waveguide 32a by ΔV to perform the phase adjustment (step S26). Here, the ΔV can be set to any value, and it is desirable that the ΔV is a small value in order to perform the phase adjustment with more high accuracy. For example, it is desirable that the ΔV is 0.1V, and it is more desirable that the ΔV is 0.05V. In addition, it is desirable that, in the phase adjustment by the phase adjustment circuit 12, the DC voltage Vp1 is started from 0V.

When it is decided that the power of the lights are the same as each other (YES of step S24), the optical power decision circuit 56 decides whether the power of the light propagated in the first output optical waveguide 38a is a tendency to increase, by the phase adjustment of the phase adjustment circuit 12 (step S28).

When it is decided in step S28 that the power of the light propagated in the first output optical waveguide 38a is the tendency to increase (YES), the signal polarity reversal circuit 50 reverses the polarity of the differential signal to be output from the drive circuit 14 (step S30). When it is decided in step S28 that the power of the light is not the tendency to increase (NO), the signal polarity reversal circuit 50 does not reverse the polarity of the differential signal.

When the phase adjustment amount decision circuit 52 decides that the absolute value of the DC voltage Vp1 applied to the phase adjustment electrode 40 of the first optical waveguide 32a exceeds the given threshold Vth (YES of step S22), the phase adjustment circuit 12 applies the DC voltage Vp2 to the phase adjustment electrode 40 of the second optical waveguide 32b to perform the phase adjustment without applying the DC voltage Vp1 to the phase adjustment electrode 40 of the first optical waveguide 32a (step S32).

Next, the optical power decision circuit 56 decides whether the power of the lights propagated in the first output optical waveguide 38a and the second output optical waveguide 38b are the same as each other (step S34). When it is decided in step S34 that the power of the lights are not the same as each other (NO), the phase adjustment circuit 12 changes the DC voltage Vp2 applied to the phase adjustment electrode 40 of the second optical waveguide 32b by ΔV to perform the phase adjustment (step S36).

When it is decided in step S34 that the power of the lights are the same as each other (YES), the optical power decision circuit 56 decides whether the power of the light propagated in the first output optical waveguide 38a is a tendency to increase, by the phase adjustment of the phase adjustment circuit 12 (step S38).

When it is decided in step S38 that the power of the light propagated in the first output optical waveguide 38a is not the tendency to increase (NO), the signal polarity reversal circuit 50 reverses the polarity of the differential signal to be output from the drive circuit 14 (step S30). When it is decided in step S28 that the power of the light is the tendency to increase (YES), the signal polarity reversal circuit 50 does not reverse the polarity of the differential signal.

As described above, according to the optical modulation apparatus of the second embodiment, when the absolute value of the amount of the phase adjustment corresponding to any one of the first optical waveguide 32a and the second optical waveguide 32b exceeds the given value, the phase adjustment circuit 12 switches the phase adjustment electrode 40 inputting the phase control signal. Then, the signal polarity reversal circuit 50 reverses the polarity of the differential signal to be output from the drive circuit 14, based on the variation tendency of the power of the lights propagated in the first output optical waveguide 38a and the second output optical waveguide 38b. Thereby, it is possible to make the logic of the output light signal used as the modulation light signal output from the first end 36a correspond with the logic of the modulation signal.

As described in the second embodiment, it is desirable that the optical modulation apparatus includes: the phase adjustment amount decision circuit 52 that decides the amount of the phase adjustment by the phase adjustment circuit 12, and when the absolute value of the amount of the phase adjustment exceeds the given value, notifies the phase adjustment circuit 12 that the absolute value of the amount of the phase adjustment exceeds the given value; and the optical power decision circuit 56 that decides the variation tendency of the power of the lights propagated in the first output optical waveguide 38a and the second output optical waveguide 38b, and notifies the signal polarity reversal circuit 50 of the variation tendency. Thereby, it is possible to determine the amount of the phase adjustment corresponding to any one of the first optical waveguide 32a and the second optical waveguide 32b by the phase adjustment circuit 12, and the variation tendency of the power of the lights propagated in the first output optical waveguide 38a and the second output optical waveguide 38b, as needed. As a result, it is possible to change the switching of the phase adjustment electrode 40 inputting the phase control signal by the phase adjustment circuit 12, and existence or nonexistence of the polarity reversal of the differential signal by the signal polarity reversal circuit 50, as needed.

The second embodiment describes an example of the control that, firstly, the DC voltage that is the phase control signal is applied to the phase adjustment electrode 40 of the first optical waveguide 32a and not applied to the phase adjustment electrode 40 of the second optical waveguide 32b. However, the second embodiment is not limited to this. Firstly, the DC voltage that is the phase control signal may be applied to the phase adjustment electrode 40 of the second optical waveguide 32b and may not applied to the phase adjustment electrode 40 of the first optical waveguide 32a.

Third Embodiment

Figure 9:
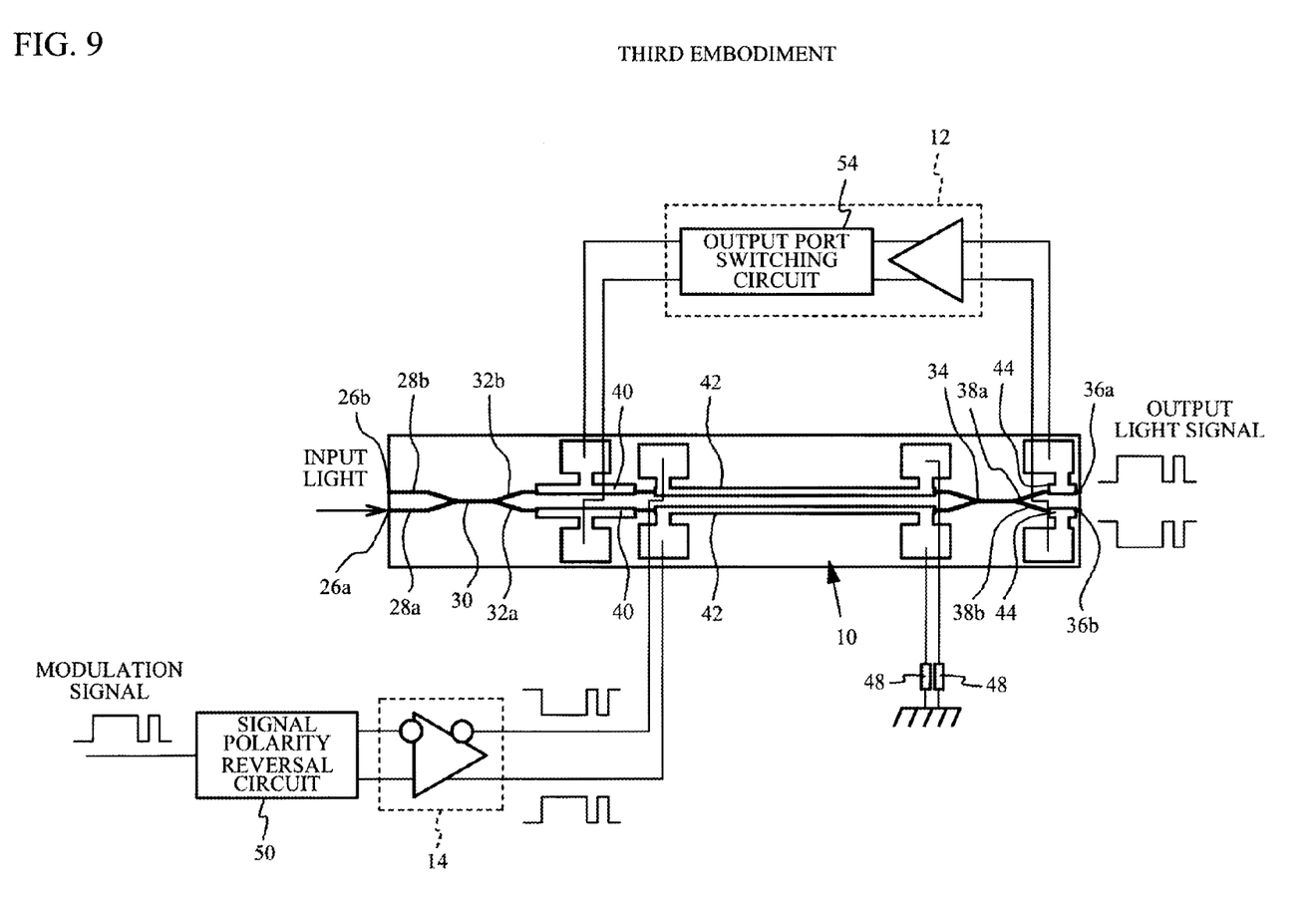
FIG. 9 is a schematic top view of the optical modulation apparatus according to a third embodiment.

FIG. 9 is a schematic top view of the optical modulation apparatus according to a third embodiment. As illustrated in FIG. 9, the optical modulation apparatus of the third embodiment differs from that of the first embodiment of FIG. 3 in not including the phase adjustment amount decision circuit 52. The other configurations of the optical modulation apparatus of the third embodiment are the same as those of the optical modulation apparatus of the first embodiment.

In the optical modulation apparatus according to first embodiment, the phase adjustment for correcting the initial phase difference $\Delta\Phi_{OS}$ caused by the manufacture variation is performed by reducing the amount of the phase adjustment. Here, the initial phase difference $\Delta\Phi_{OS}$ is an unique value of each device. Therefore, the phase adjustment amount decision circuit 52 is temporarily connected to the optical modulation apparatus in advance, and the selected phase adjustment electrode 40 to which the DC voltage is applied and existence or nonexistence of the polarity reversal of the differential signal may be set to the phase adjustment circuit 12 and the signal polarity reversal circuit 50, respectively. Thereby, it is possible to reduce the amount of the phase adjustment without constantly connecting the phase adjustment amount decision circuit 52. The optical modulation apparatus of the third embodiment is used in such a case.

That is, the optical modulation apparatus according to the third embodiment includes: the phase adjustment circuit 12 that outputs the phase control signal to any one of the phase adjustment electrodes 40 provided on the first optical waveguide 32a and the second optical waveguide 32b, and has a function for switching the phase control signal between the respective phase adjustment electrodes 40; and the signal polarity reversal circuit 50 that reverses the polarity of the differential signal to be output from the drive circuit 14. The optical modulation apparatus includes such a phase adjustment circuit 12 and such a signal polarity reversal circuit 50, and it is therefore possible to restrain the DC voltage to be applied to the phase adjustment electrode 40 from increasing, restrain the propagation loss of the lights and perform the phase adjustment. In addition, it is possible to make the logic of the output light signal used as the modulation light signal correspond with the logic of the modulation signal.

It is desirable that the switching of the phase adjustment electrode 40 inputting the phase control signal by the phase adjustment circuit 12 is performed in conjunction with the polarity reversal of the differential signal by the signal polarity reversal circuit 50. The switching of the phase adjustment electrode 40 inputting the phase control signal by the phase adjustment circuit 12, and the polarity reversal of the differential signal by the signal polarity reversal circuit 50 may operate at the same time. Thereby, the phase difference between the lights propagated in the first optical waveguide 32a and the second optical waveguide 32b can be achieved by a small range of the phase adjustment.

In the first to third embodiments, a target value of a cross point of the output light signals output from the first output end 36a and the second output end 36b is 50%. However, the first to third embodiments are not limited to this. The target value of the cross point may be a value other than 50%.

The present invention is not limited to the specifically described embodiments and variations but other embodiments and variations may be made without departing from the scope of the claimed invention.

What is claimed is:

1. An optical modulation apparatus comprising:
    a Mach-Zehnder optical modulator having two optical waveguides, two output optical waveguides and a join-and-branch portion;
    a phase adjustment circuit configured to output a phase control signal to phase adjustment electrodes provided respectively on the two optical waveguides;
    a drive circuit configured to output a modulation signal to modulation electrodes provided respectively on the two optical waveguides as a differential signal, the modulation signal modulating lights propagated in the two optical waveguides; and
    a signal polarity reversal circuit configured to reverse a polarity of the differential signal to be output from the drive circuit,
    wherein the phase adjustment circuit having a function for switching the phase control signal between the phase adjustment electrodes.

2. The optical modulation apparatus according to claim 1, wherein the reversal of the polarity of the differential signal by the signal polarity reversal circuit is performed in conjunction with the switching by the phase adjustment circuit.

3. The optical modulation apparatus according to claim 1, wherein when an absolute value of an amount of phase adjustment corresponding to any one of the two optical waveguides by the phase adjustment circuit exceeds a given value, the phase adjustment circuit switches the phase control signal between the phase adjustment electrodes, and the signal polarity reversal circuit reverses the polarity of the differential signal.

4. The optical modulation apparatus according to claim 3, further comprising a phase adjustment amount decision circuit configured to decide the absolute value of the amount of the phase adjustment exceeds the given value.

5. An optical modulation apparatus comprising:
    a Mach-Zehnder optical modulator having two optical waveguides, two output optical waveguides and a join-and-branch portion;
    a phase adjustment circuit configured to output a phase control signal to phase adjustment electrodes provided respectively on the two optical waveguides;
    a drive circuit configured to output a modulation signal to modulation electrodes provided respectively on the two optical waveguides as a differential signal, the modulation signal modulating lights propagated in the two optical waveguides; and
    a signal polarity reversal circuit configured to reverse a polarity of the differential signal to be output from the drive circuit,
    wherein when an absolute value of an amount of phase adjustment corresponding to any one of the two optical waveguides by the phase adjustment circuit exceeds a given value, the phase adjustment circuit switches the phase control signal between the phase adjustment electrodes, and the signal polarity reversal circuit reverses the polarity of the differential signal based on variation tendency of power of the lights propagated in the two output optical waveguides.

6. The optical modulation apparatus according to claim 5, further comprising:
    a phase adjustment amount decision circuit configured to decide the absolute value of the amount of the phase adjustment exceeds the given value; and
    an optical power decision circuit configured to decide the variation tendency of the power of the lights propagated in the two output optical waveguides.

7. The optical modulation apparatus according to claim 3, wherein the given value is $0.5\pi$.

8. A method for controlling an optical modulator having two optical waveguides, two output optical waveguides and a join-and-branch portion, comprising:
    switching a phase control signal between phase adjustment electrodes provided respectively on the two optical waveguides; and
    reversing a polarity of a modulation signal composed of a differential signal, the modulation signal modulating lights propagated in the two optical waveguides.

9. The method for controlling the optical modulator according to claim 8, wherein the switching and the reversing are performed when an absolute value of an amount of phase adjustment corresponding to any one of the two optical waveguides exceeds a given value.

10. The method for controlling the optical modulator according to claim 8, wherein the switching is performed when an absolute value of an amount of phase adjustment corresponding to any one of the two optical waveguides exceeds a given value, the reversing is performed based on variation tendency of power of the lights propagated in the two output optical waveguides.

11. A control device for an optical modulator having two optical waveguides, two output optical waveguides and a join-and-branch portion, comprising:
    a phase adjustment circuit configured to output a phase control signal to phase adjustment electrodes provided respectively on the two optical waveguides;
    a drive circuit configured to output a modulation signal to modulation electrodes provided respectively on the two optical waveguides as a differential signal, the modulation signal modulating lights propagated in the two optical waveguides; and a signal polarity reversal circuit configured to reverse a polarity of the differential signal to be output from the drive circuit, wherein the phase adjustment circuit having a function for switching the phase control signal between the phase adjustment electrodes.

* * * * *